US011342132B2

United States Patent
Tan et al.

(10) Patent No.: US 11,342,132 B2
(45) Date of Patent: May 24, 2022

(54) ELECTRODE FOR SUPERCAPACITOR, PREPARATION METHOD AND USE THEREOF

(71) Applicant: GUANGDONG TECHNION ISRAEL INSTITUTE OF TECHNOLOGY, Shantou (CN)

(72) Inventors: Daniel Qi Tan, Shantou (CN); Dayarker Gandla, Shantou (CN); Guanghui Song, Shantou (CN)

(73) Assignee: Guangdong Technion Israel Institute of Technology, Shantou (CN)

( * ) Notice: Subject to any disclaimer, the term of this patent is extended or adjusted under 35 U.S.C. 154(b) by 0 days.

(21) Appl. No.: 16/931,705

(22) Filed: Jul. 17, 2020

(65) Prior Publication Data
US 2021/0335556 A1  Oct. 28, 2021

(51) Int. Cl.
*H01G 11/46* (2013.01)
*H01G 11/30* (2013.01)

(52) U.S. Cl.
CPC ............. *H01G 11/46* (2013.01); *H01G 11/30* (2013.01)

(58) Field of Classification Search
CPC ..................................................... H01G 11/46
See application file for complete search history.

(56) References Cited

U.S. PATENT DOCUMENTS

| 5,728,181 A * | 3/1998 | Jung ...................... H01M 4/02 29/623.5 |
| 2009/0130564 A1* | 5/2009 | Shembel ................ H01G 11/28 429/232 |
| 2011/0281174 A1* | 11/2011 | Seymour ................ H01G 11/24 429/306 |

OTHER PUBLICATIONS

Hu et al., Battery-like MnCo2O4 electrode materials combined with active carbon for hybrid supercapacitors, 2019, Electochimica Acta, 306, (2019), pp. 599-609 (Year: 2019).*
Sahoo et al., Electrodeposition of spinel MnCo2O4 nanosheets for supercapacitor applications , 2015, Nanotechnology 28 (2015) 455401 (8pp) (Year: 2015).*

* cited by examiner

Primary Examiner — Eric W Thomas
(74) Attorney, Agent, or Firm — Fay Sharpe LLP (57) ABSTRACT

The present disclosure relates to an electrode for supercapacitor, preparation method and use thereof. The electrode has an electrode terminal, an active layer and a coating layer from inside to outside. A material for preparing the coating layer includes an oxygenated compound, which contains at least one of transition metal elements or is doped with a substance containing a transition metal element. The coating layer on the surface of the active layer prevents organic electrolytes from being easily adsorbed and nucleated in the porous structure of the electrode surface due to interface defects, and facilitates to weaken the interface problems existing between the electrolyte and the electrode surface. The capacitor can significantly increase the operating voltage window (may be up to above 4V) and capacitance of the supercapacitor, and further increase energy density thereof.

10 Claims, 13 Drawing Sheets

ELECTRODE FOR SUPERCAPACITOR, PREPARATION METHOD AND USE THEREOF

CROSS-REFERENCE TO RELATED APPLICATIONS

This application is based on and claims the benefit of priority from Chinese Patent Application No. 2020103389394, filed on 26 Apr. 2020, the entirety of which is incorporated by reference herein.

TECHNICAL FIELD

The present disclosure relates to the field of electrochemistry, particularly to an electrode for a supercapacitor, preparation method and use thereof.

BACKGROUND

A supercapacitor, also called an electrochemical capacitor, is a class of new energy-storing elements, which are based on electrode material such as carbon with a high specific surface area, metal oxides or conductive polymers. A supercapacitor is mainly composed of electrodes, electrolytes and separators, and can store electrical charges in an electric double-layer at the interface between the electrode and electrolyte. The supercapacitor can recover energy from many repetitive processes, such as vehicle braking or wind turbine pitch systems. In addition, the supercapacitor has been successfully applied to the fields of national defense, aerospace, automobile industry, consumer electronics, communication, electric power, railway and the like, because it has many advantages such as high capacity, high energy density, high charge-discharge current and long cycle lifetime. Its applications are still expanding.

Figure 1:
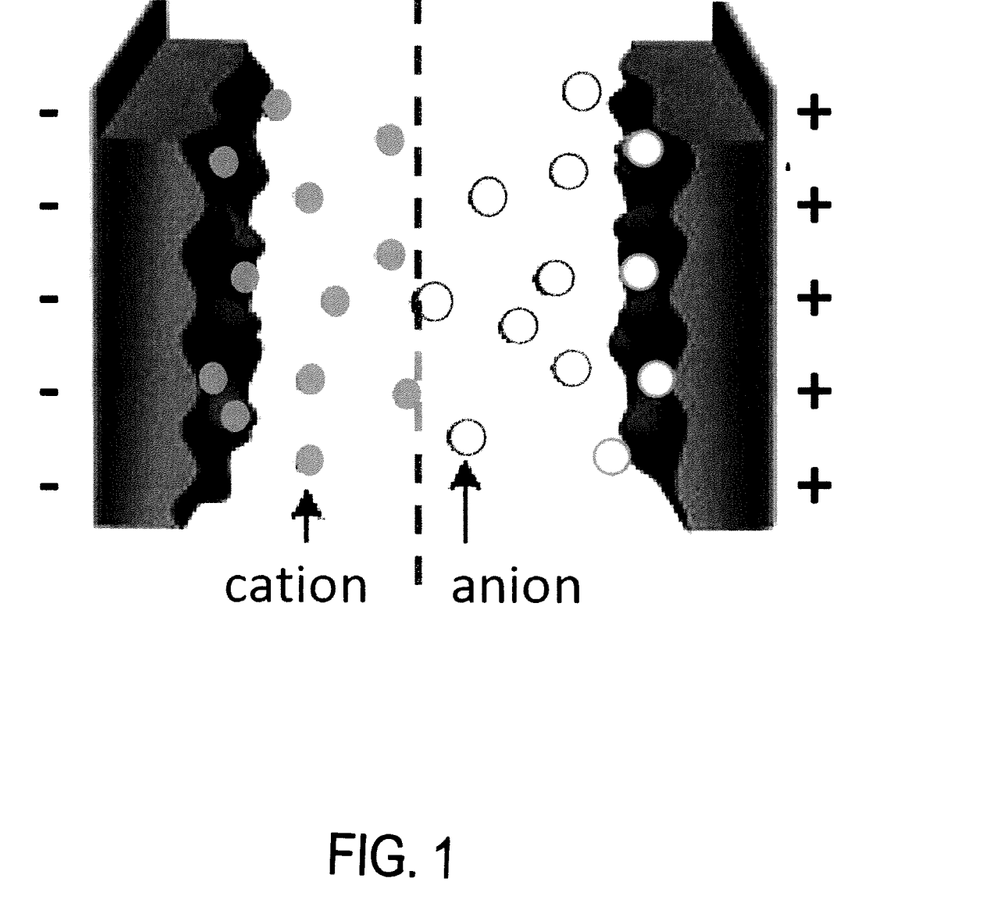
FIG. 1 illustrates the structure schematic diagram of a symmetric supercapacitor composed of activated carbon in the prior art.

According to the energy storage mechanisms of positive and negative electrodes, the supercapacitor can be divided into symmetric and asymmetric supercapacitors. The symmetric supercapacitor refers to the positive and negative electrodes having the same energy storage mechanism. In contrast, the asymmetrical supercapacitor refers to the positive and negative electrodes having different energy storage mechanisms. At present, the widely used carbon/carbon double-layer capacitor is a representative of the symmetric supercapacitor (as shown in FIG. 1). The carbon/carbon double-layer capacitor has a high specific surface area and good chemical stability, but has small potential window and low energy density. The asymmetric supercapacitor means that at least one of the positive and negative electrodes of the capacitor is a pseudocapacitor electrode of high specific energy material, such as metal oxides, lithium-based compounds, graphene and MXene. An apparatus equipped with the asymmetric supercapacitor has wider potential window and higher energy density, but has poor cycle stability.

Therefore, it has great significance to develop electrode material which can be used for preparing capacitors with high energy density and good cycle stability.

SUMMARY

The present disclosure is intended to solve at least one of the technical problems in the prior art. For this, the present disclosure provides an electrode for supercapacitor, which can be used to prepare a supercapacitor with high volumetric energy density and long cycle life.

In a conventional supercapacitor, since charges distribute on the surface of a carbon layer, the ion sizes in an electrolyte would determine the apparatus operating voltage, which usually ranges from 2.5 to 3 V and is also the breakdown voltage thereof. Under high pressure, carbon reacts with the electrolyte to form a solid electrolyte interface, which will eventually be broken down at the interface of the active conductive layer. Higher voltage and smaller ion particles in the electrolyte also lead to the increasing degradation of the electrolyte over time. Smaller ions tend to pass through the conductive active layer which results in more ion leakage, thereby leading to depletion and degradation of the electrolyte. For example, accumulated charges on the surface of carbon powder are gradually consumed due to the charge leakage, and the residual charges (ions) in the electrolyte are insufficient to support the supercapacitor to work normally when the breakdown occurs. Since the charge accumulation on the carbon surface is exponentially related to the voltage, the higher the operating voltage of the supercapacitor is, the more electrolyte charge is consumed. As the electrolyte charges are further consumed, the electrolyte is further degraded, resulting in reduced capacitance, increased impedance, reduced energy density, as well as shortened supercapacitor lifetime.

The electrode of the present disclosure weakens the issues of the interface between the electrolyte and the electrode surface by providing a coating layer on the surface of the active layer, such that the electrode terminal can withstand a higher operating voltage, and the operating voltage window and capacitance of the electrochemical container can be further significantly increased.

Further, the present disclosure provides a preparation method for the above electrode.

Further, the present disclosure provides a supercapacitor including the above electrode.

Further, the present disclosure provides an apparatus including the above supercapacitor.

In the first aspect, according to an embodiment of the present disclosure, the electrode for supercapacitor includes an electrode terminal, an active layer and a coating layer from inside to outside. The electrode for supercapacitor includes an electrode terminal, an active layer and a coating layer from inside to outside. Material for preparing the coating layer includes an oxygenated compound, which contains at least one of transition metal elements or is doped with a substance containing a transition metal element.

According to some embodiments of the present disclosure, the transition metal is at least one selected from Zn, Co, Ti or Mn.

According to some embodiments of the present disclosure, the material for preparing the coating layer is at least one selected from zinc-doped alumina (preferable $yZn \cdot (1-y)Al_2O_3$, $y=0.001$-$0.99$), zinc oxide-doped alumina (preferable $wZnO \cdot (1-w)Al_2O_3$, $w=0.001$-$0.99$), non-stoichometric titanium oxide ($TiO_{2-x}$, $x=0.01$-$1$) or $MnCo_2O_4$.

According to some embodiments of the present disclosure, the coating layer has a thickness of not less than 1 nm, preferably a thickness of not more than 20 nm, more preferably a thickness ranging from 1 to 10 nm, further preferably ranging from 1 to 4 nm, further more preferable of being 2 nm.

According to some embodiments of the present disclosure, the active layer is at least one selected from conductive polymer, cellulose, carbon, oxygenated metal compounds or MXene $Ti_3C_2T_z$, wherein T is a surface terminal element, $z>0$; preferably, T is C or N.

According to some embodiments of the present disclosure, the carbon is selected from activated carbon, single-walled carbon nanotubes, fullerene, multi-walled carbon nanotubes, diamond-like carbon, diamond, nano diamond-based material, amorphous carbon, carbon black, carbon powder, microsphere, graphite, graphene, carbon fiber, carbon felt, graphitic polyhedral crystal, highly ordered pyrolytic graphite, xerogel, aerogel, nano-structured carbon or hydrogenated amorphous carbon. Preferably, the activated carbon is selected from doped- or undoped activated carbon. More preferably, the doped activated carbon is N-doped activated carbon.

According to some embodiments of the present disclosure, the oxygenated metal compound is selected from $RuO_2$, $PbO_2$, $MnO_2$, lithium cobaltate, lithium manganate, lithium titanate or $LiMnNiO_x$, wherein x is greater than zero. Preferably, the $LiMnNiO_x$ is $Li(MnNi)_2O_4$.

According to some embodiments of the present disclosure, the MXene is $Ti_3C_2T_z$ (TZ is a surface terminal element, such as C or N, and z is preferable 1, 2 or 3).

The electrode according to the embodiments of the present disclosure has at least the following beneficial effects. Providing the coating layer on the surface of the active layer through Atomic Layer Deposition (ALD), prevents organic electrolytes from being easily adsorbed and nucleated in the porous structure of the electrode surface due to interface defects, and facilitates to weaken the interface problems existing between the electrolyte and the electrode surface. The capacitor prepared by means of the electrode according to the embodiments of the present disclosure can significantly increase the operating voltage window (may be up to above 4V) and capacitance of the supercapacitor, and further increase energy density thereof.

In the second aspect, according to an embodiment of the present disclosure, the preparation method includes the following steps: taking an electrode terminal with an active layer, and depositing a coating layer on the active layer to obtain the electrode for supercapacitor;

wherein material for preparing the coating layer includes an oxygenated compound, which contains at least one of transition metal elements or is doped with a substance containing a transition metal element.

According to some embodiments of the present disclosure, the material for preparing the coating layer is at least one selected from zinc doped alumina, zinc oxide-doped alumina, titanium dioxide or $MnCo_2O_4$.

According to some embodiments of the present disclosure, the coating layer has a thickness of not less than 1 nm, preferably a thickness of not more than 20 nm, more preferably a thickness ranging from 1 to 10 nm, further preferably ranging from 1 to 4 nm, further more preferably being 2 nm.

According to some embodiments of the present disclosure, the active layer is at least one selected from a conductive polymer, cellulose, carbon, an oxygenated metal compound or MXene $Ti_3C_2T_z$, wherein T is a surface terminal element and is preferable C or N; $z>0$.

According to some embodiments of the present disclosure, the carbon is selected from activated carbon, single-walled carbon nanotubes, fullerene, multi-walled carbon nanotubes, diamond-like carbon, diamond, nano diamond-based material, amorphous carbon, carbon black, carbon powder, microsphere, graphite, graphene, carbon fiber, carbon felt, graphitic polyhedral crystal, highly ordered pyrolytic graphite, xerogel, aerogel, nano-structured carbon or hydrogenated amorphous carbon. Preferably, the activated carbon is selected from doped- or undoped activated carbon. More preferably, the doped activated carbon is N-doped activated carbon.

According to some embodiments of the present disclosure, the oxygenated metal compound is selected from $RuO_2$, $PbO_2$, $MnO_2$, lithium cobaltate, lithium manganate, lithium titanate or $LiMnNiO_x$, wherein x is greater than zero. Preferably, the $LiMnNiO_x$ is $Li(MnNi)_2O_4$.

According to some embodiments of the present disclosure, the MXene is $Ti_3C_2T_z$ (TZ is a surface terminal element, such as C or N, and z is 1, 2 or 3).

The preparation method according to the embodiments of the present disclosure has at least the following beneficial effects: the coating layer, which is prepared by an Atomic Layer Deposition (ALD) process, has better uniformity.

In the third aspect, according to an embodiment of the present disclosure, a supercapacitor includes two electrodes, each of which includes an electrode terminal and an active layer, wherein at least one of the active layers of the electrodes has a coating layer. Material for preparing the coating layer includes an oxygenated compound, which contains at least one of transition metal elements or is doped with a substance containing a transition metal element.

According to some embodiments of the present disclosure, the material for preparing the coating layer is at least one selected from zinc doped alumina, zinc oxide-doped alumina, titanium oxide ($TiO_{2-x}$, x=0.01-1) or $MnCo_2O_4$.

According to some embodiments of the present disclosure, the coating layer has a thickness of not less than 1 nm, preferably a thickness of not more than 20 nm, more preferably a thickness ranging from 1 to 10 nm, further preferably ranging from 1 to 4 nm, further more preferably being 2 nm.

According to some embodiments of the present disclosure, the active layer is at least one selected from a conductive polymer, cellulose, carbon, an oxygenated metal compound or MXene $Ti_3C_2T_z$, wherein T is a surface terminal element and is preferably C or N; $z>0$.

According to some embodiments of the present disclosure, the carbon is selected from activated carbon, single-walled carbon nanotubes, fullerene, multi-walled carbon nanotubes, diamond-like carbon, diamond, nano diamond-based material, amorphous carbon, carbon black, carbon powder, microsphere, graphite, graphene, carbon fiber, carbon felt, graphitic polyhedral crystal, highly ordered pyrolytic graphite, xerogel, aerogel, nano-structured carbon or hydrogenated amorphous carbon. Preferably, the activated carbon is selected from doped- or undoped activated carbon. More preferably, the doped activated carbon is N-doped activated carbon.

According to some embodiments of the present disclosure, the oxygenated metal compound is selected from $RuO_2$, $PbO_2$, $MnO_2$, lithium cobaltate, lithium manganate, lithium titanate or $LiMnNiO_x$, wherein x is greater than zero. Preferably, the $LiMnNiO_x$ is $Li(MnNi)_2O_4$.

According to some embodiments of the present disclosure, the MXene is $Ti_3C_2T_z$ (TZ is a surface terminal element such as C or N, and z is selected from 1, 2 or 3).

According to some embodiments of the present disclosure, the active layers of both of the electrodes may be made of same or different conductive material. Preferably, both of the electrodes are provided with the coating layer, when the active layers of both of the electrodes are made of the same material; and, only one of the electrodes is provided with the coating layer on the surface of the active layer, when the active layers of the two electrodes are made of different materials. That is, the capacitor may be a symmetric or asymmetric supercapacitor. For the symmetric electrodes, the coating layers from ALD are provided on the surfaces of both of the electrodes. When the capacitor is an asymmetric capacitor, the coating layer from ALD is only provided on the active layer of one of the electrodes.

According to some embodiments of the present disclosure, the active layers of the two electrodes are made from non-activated and activated carbon.

According to some embodiments of the present disclosure, the supercapacitor further includes an electrolyte, which is distributed between two electrodes and can be any substance suitable for an electrochemical capacitor. The electrolyte comprises, but is not limited to, an aqueous solution such as KOH or KI solution; an acid solution such as sulfuric acid solution; a salt solution such as sodium sulfate solution; an organic electrolyte solution such as Tetraethyl Ammonium Tetrafluoroborate (TEABF4) dissolved in propylene carbonate (PC) and acetonitrile; or, an ionic liquid electrolyte solution such as 1-ethyl-3-methyl-imidazolium tetrafluoroborate, 1-ethyl-3-methylimidazolium bis(trifluoromethylsulfonimide)imine, trimethylsulfonyl bis(trifluorometsulfonimide) or 1-butyl-3-methylimidazole solution. Among them, the increase of the capacitance window of the aqueous or acid solution is not as obvious as that of the organic electrolyte. The ionic liquid electrolyte, due to its larger ion sizes, has a higher operating voltage than that of the organic electrolyte. The organic electrolyte can operate at a higher voltage, because it has larger ion particle sizes which can provide a certain degradation resistance through ions leaked from the terminal layer. There is a conductive path from the interface between the active layer and the electrolyte to the substrate of the electrode terminal, and the ions from the electrolyte occupy a large surface area of the porous carbon material, so as to form a high capacitance structure.

According to some embodiments of the present disclosure, the supercapacitor further comprises a separator, which is located in the electrolyte and functions as an insulator for preventing the passage of electrons. The insulator material includes, but is not limited to, oxides, hydroxides, halides, hydrides, self-assembled monolayers, plastic and polymers.

In the fourth aspect, according to an embodiment of the present disclosure, an apparatus comprises the above supercapacitor.

According to some embodiments of the present disclosure, the apparatus is selected from a household electric appliance, a 3C electronic product or a new energy vehicle.

According to some embodiments of the present disclosure, the 3C electronic product is selected from a mobile phone, a tablet computer, a notebook computer or a digital audio player.

Additional features and advantages of the present disclosure will be set forth in the following description. The present disclosure will partly become apparent from the description below, or be understood through practice of the disclosure.

DETAILED DESCRIPTION

In order to explain the technical solution, purpose and effect of the disclosure in detail, the following description will be made with reference to the embodiments and the drawings.

Figure 2:
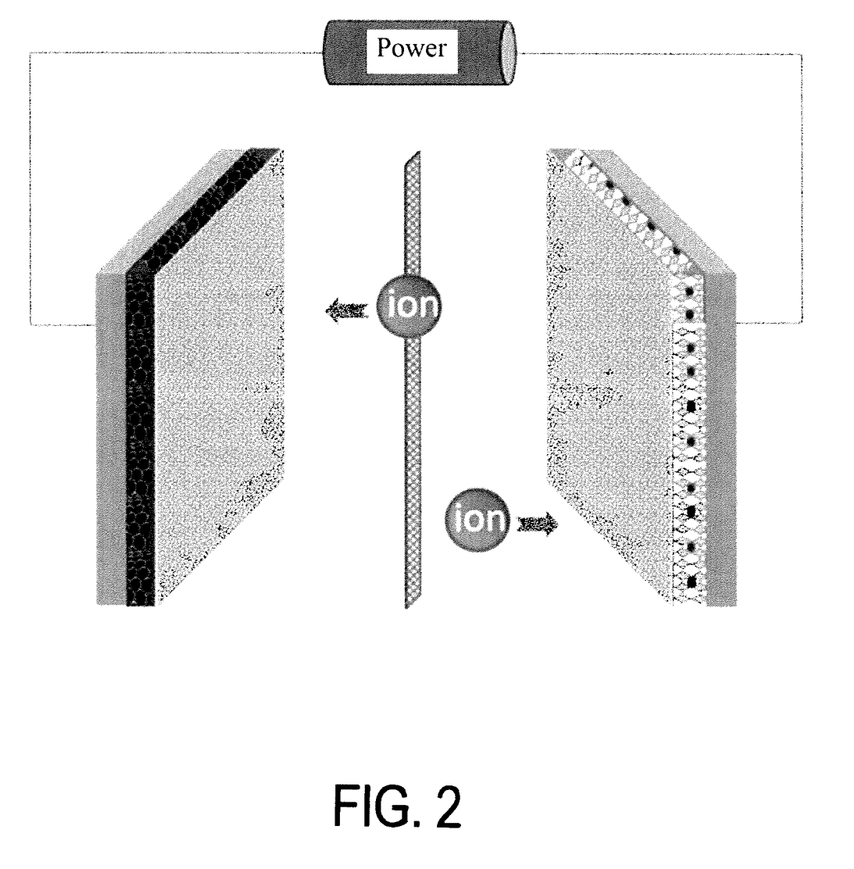
FIG. 2 illustrates the structure schematic diagram of an asymmetric supercapacitor in a charging state according to Example 1 of the present disclosure.

Example 1 of the disclosure is a supercapacitor, which comprises two electrodes, an electrolyte (TEABF4) and a separator (polytetrafluoroethylene). Each of the electrodes comprises an electrode terminal (a current collector) and an active layer. The active layer of one electrode terminal is nano carbon provided with a coating layer on its surface. The active layer of the other electrode terminal is an organic compound provided with a coating layer on its surface as well. FIG. 2 shows the charging state of the supercapacitor. The coating layer is zinc oxide-doped alumina ($wZnO \cdot (1-w)Al2O3$, $w=0.2$) and has a thickness of 2 nm. The coating layer is formed by means of ALD.

Figure 3:
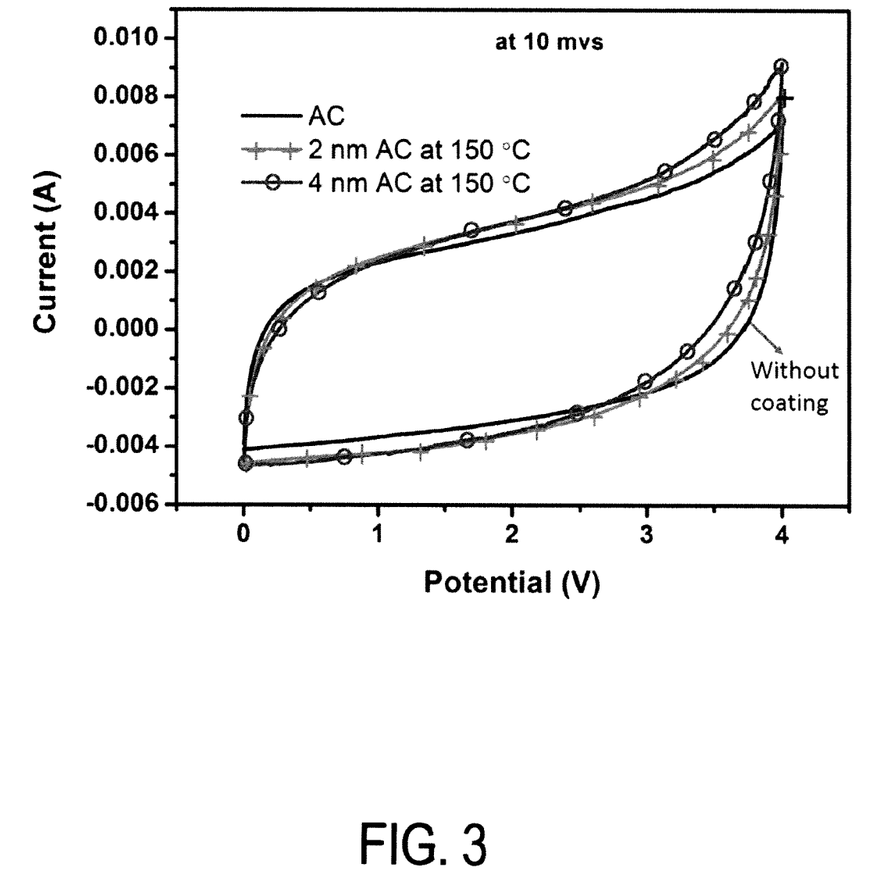
FIG. 3 illustrates the CV diagram of the different electrodes according to Example 1 of the present disclosure.

The above supercapacitor, a supercapacitor having a coating layer thickness of 4 nm and a traditional capacitor having no coating layer on the electrode surface, were tested for the CV diagrams at the same scanning speed (10 mV/s) at 150° C. The results are as shown in FIG. 3. It can be seen from FIG. 3 that, even at 150° C., the electrodes with coating layers have similar capacitance at 4V, and the capacitance increases as the thickness of the coating layer increases.

Figure 4:
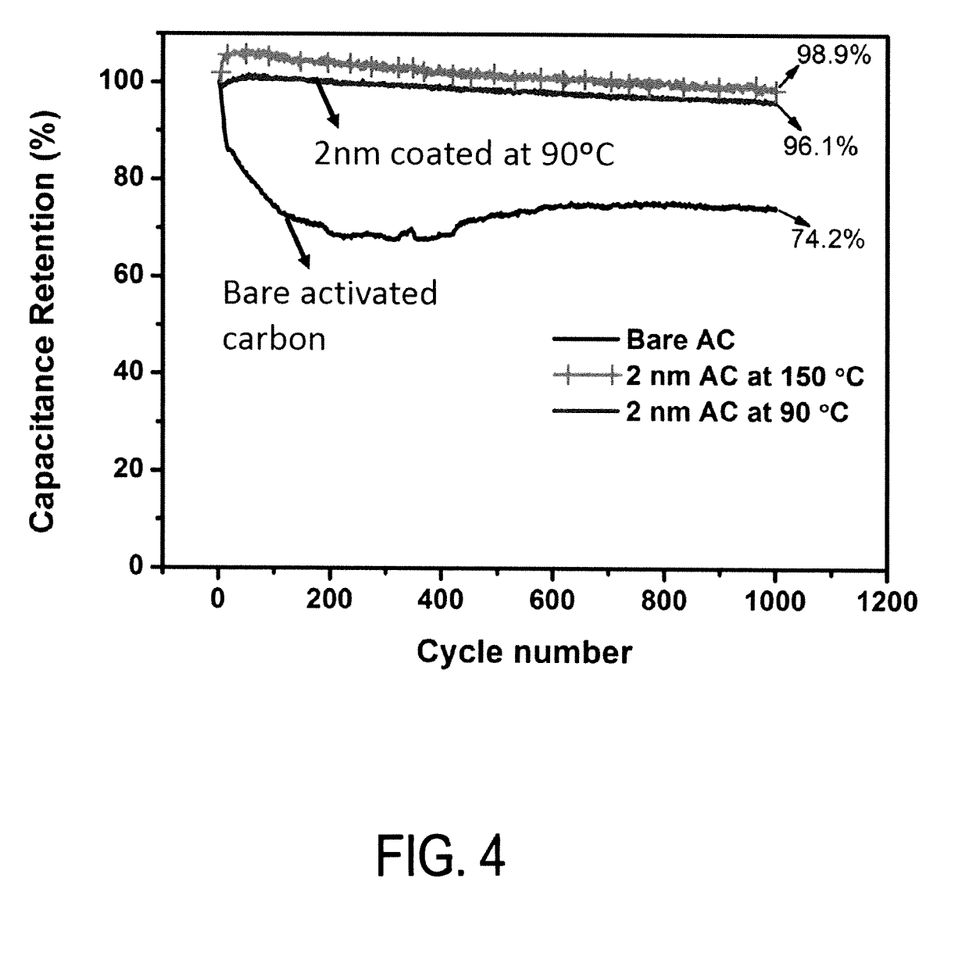
FIG. 4 illustrates the cycle life test results of the electrodes according to Example 1 of the present disclosure and the traditional electrodes at different temperatures.

The above electrodes of Example 1, and bare electrodes without coating layers (as a control) were used to make into a dual-electrode button cell, so as to test the electrochemical performances of the activated carbon electrodes with the coating layers. The cycle life test results are shown in FIG. 4. It can be seen from FIG. 4 that the cycle life of the activated carbon electrodes with the coating layers is significantly superior to that of the bare electrodes, and the electrodes have better cycle stability at 150° C. than at 90° C.

Figure 5:
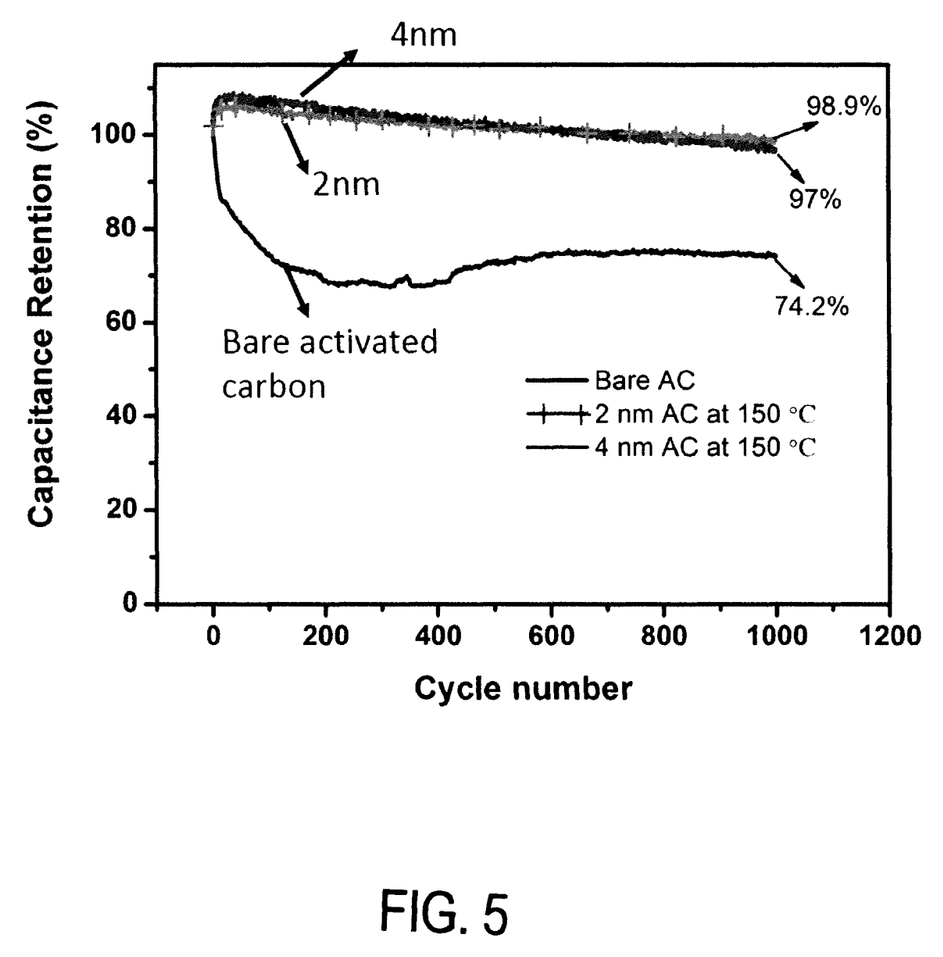
FIG. 5 illustrates the cycle life test results of the electrodes with different thicknesses of coating layers according to Example 1 of the disclosure and the traditional electrodes at different temperatures.

The cycle life test results of the electrodes with different thicknesses of coating layers are shown in FIG. 5. It can be seen from FIG. 5 that the increase of the coating layer thickness has little influence on cycle life.

Figure 6:
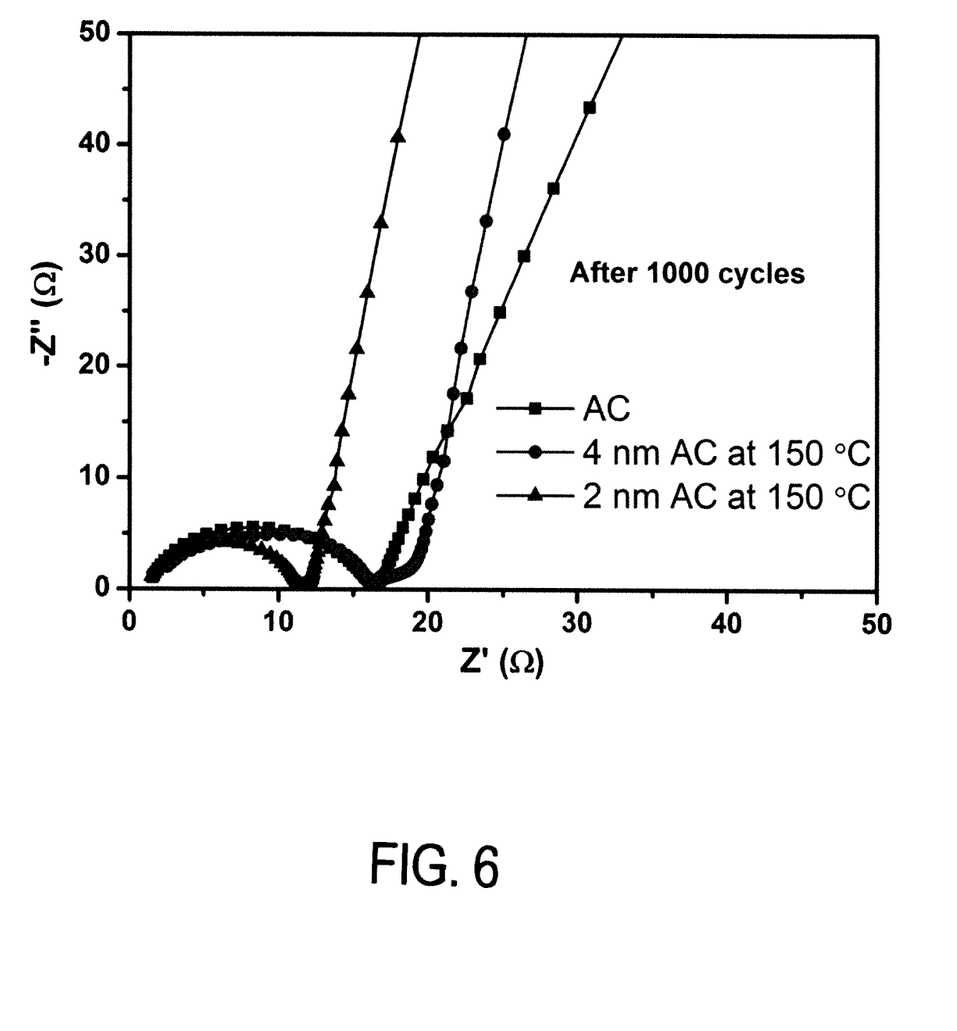
FIG. 6 illustrates the impedance test results of the electrodes with different thicknesses of coating layers according to Example 1 of the disclosure and the traditional electrodes.
Figure 7:
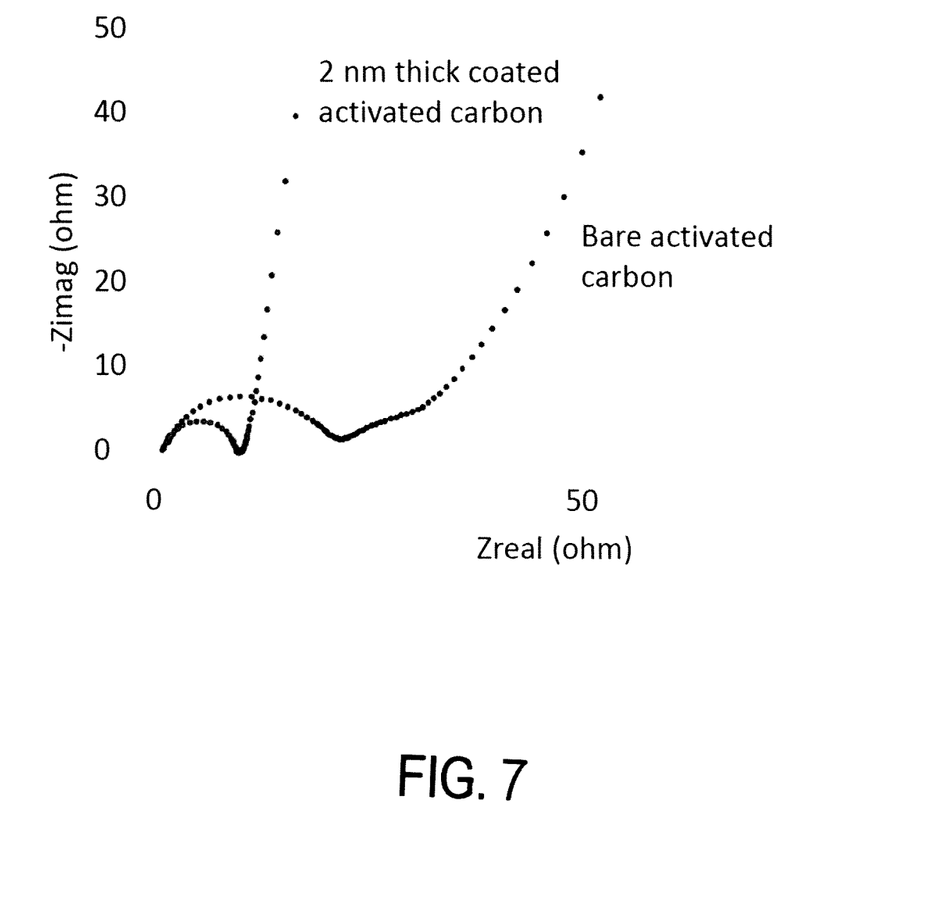
FIG. 7 illustrates the impedance test results of the electrode according to Example 1 of the disclosure and the traditional electrodes after 5000 cycles.

The impedance test results of the electrodes with different thicknesses of coating layers are shown in FIG. 6. It can be seen from FIG. 6 that the impedance of the electrodes with the coating layers is significantly lower than that of the bare electrode after 1000 cycles, and the electrode with the coating layer of 2 nm has lower impedance than that of the electrode with the coating layer of 4 nm. FIG. 7 shows the impedance test result of the electrode with the coating layer of 2 nm after 5000 cycles. It can be seen from FIG. 7 that the impedance of the electrode according to this Example of the disclosure substantially maintain unchanged even after 5000 cycles, while the impedance of the bare electrode significantly increased. In addition, the electrodes with coating layers of other dopant ratios were also tested, and were found that they all had good performances.

Figure 8:
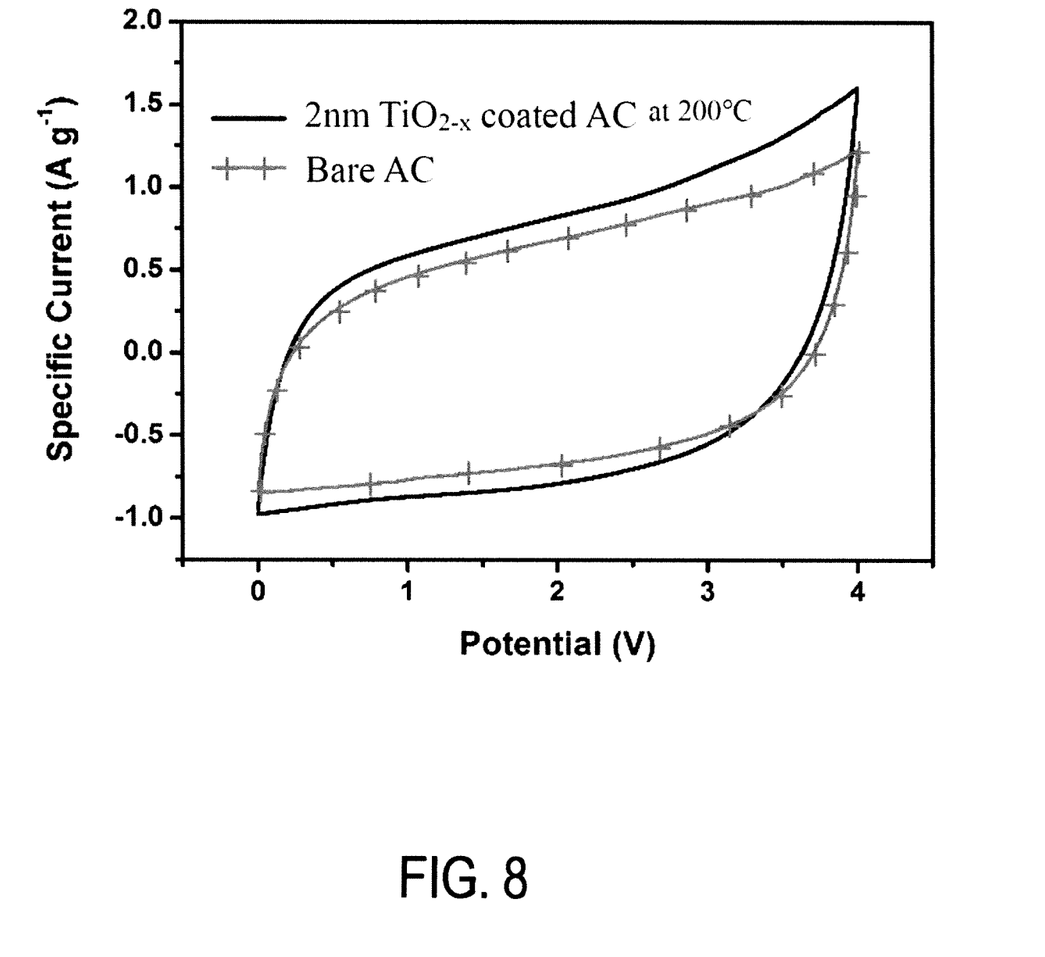
FIG. 8 illustrates the voltage vs. current density diagram of the electrode according to Example 2 of the disclosure and the traditional electrodes.
Figure 9:
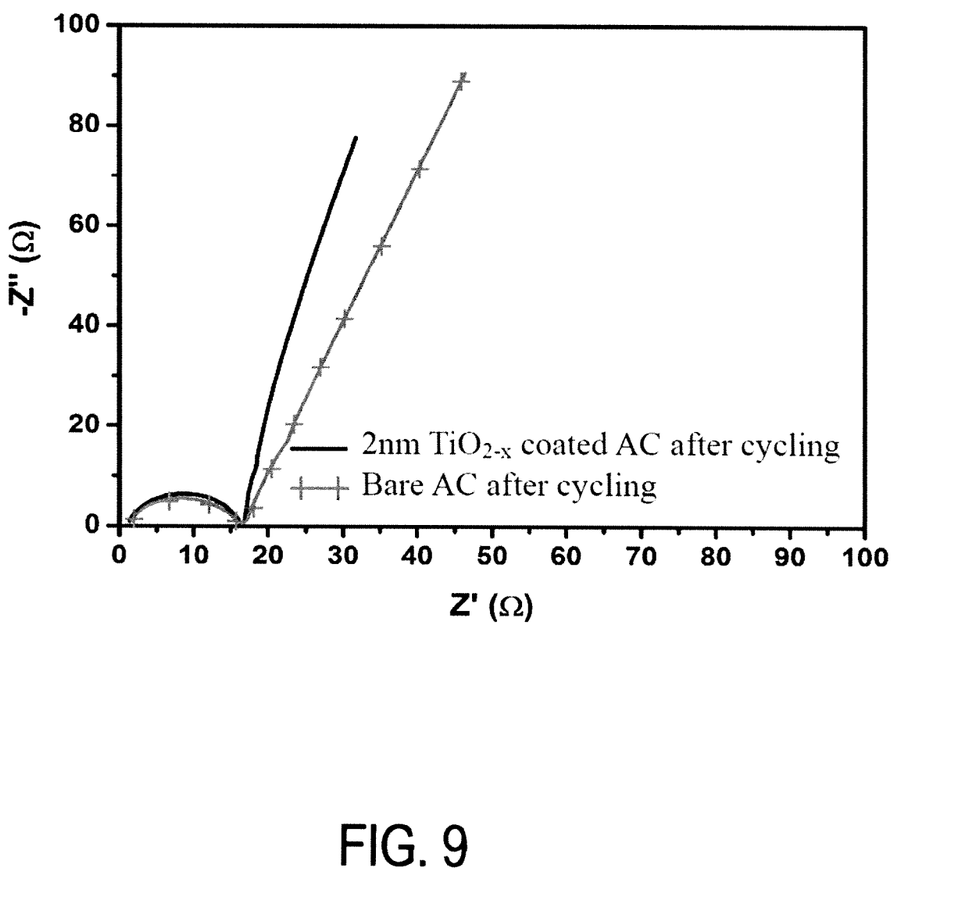
FIG. 9 illustrates the impedance test results of the electrode according to Example 2 of the disclosure and the traditional electrode after 5000 charge-discharge cycles.
Figure 10:
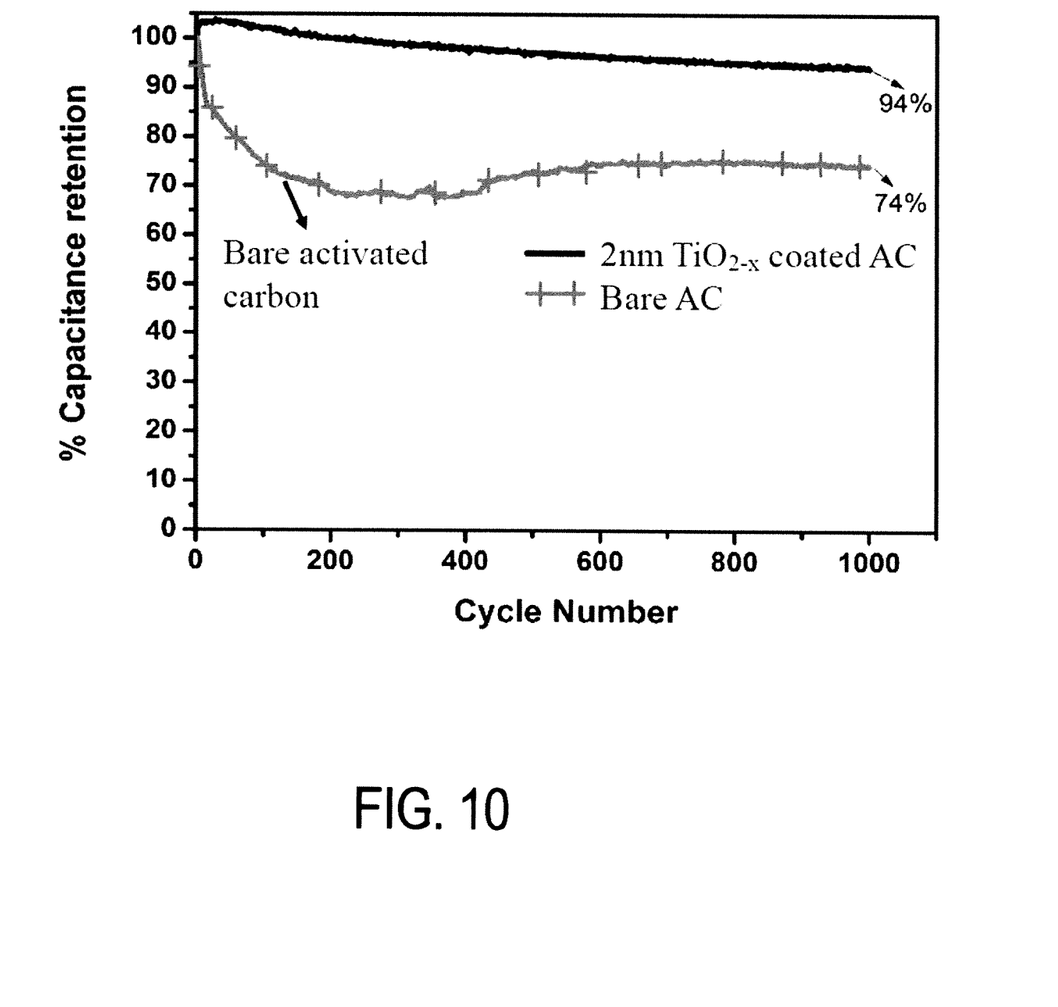
FIG. 10 illustrates the cycle life test results of the electrode according to Example 2 of the disclosure and the traditional electrode.

Example 2 of the present disclosure was an electrode including: an electrode terminal which was a current collector; an active layer which was activated carbon; and, a coating layer which was a titanium oxide (TiO2-x, x=0.1) layer. The electrodes were made into dual-electrode symmetric button cell (1 M TEABF4/acetonitrile), so as to test the electrochemical performances of the activated carbon electrode with the coating layers. The results are shown in FIGS. 8-10. FIG. 8 shows the results measured at a scanning speed of 50 mV/S. FIG. 9 shows the electrochemical impedance of the electrode with a coating layer of 2 nm thickness and the bare electrode after 5000 cycles. FIG. 10 shows the cycle stability measured at 4V. There is no substantial decrease in the capacitance of the electrode with the coating layer after 1000 cycles. It can be seen from FIGS. 8-10 that, at 200° C., the electrodes with the coating layers have higher current density/capacitance, lower impedance and better capacitance stability, as compared to the bare activated carbon electrode. When x is between 0.01 and 1, the electrode with the coating layer still shows similar performances.

Figure 11:
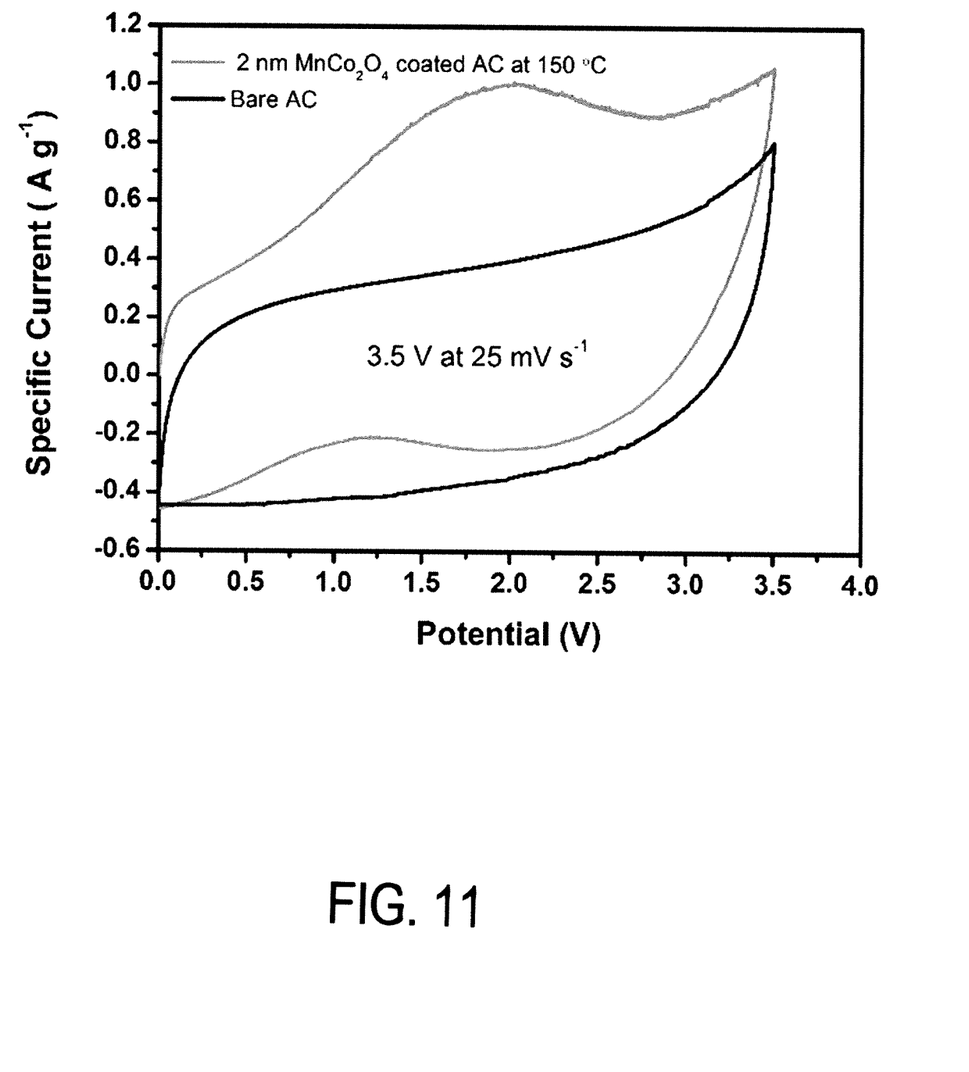
FIG. 11 illustrates the voltage vs. current density diagram, measured at 3.5V, of the electrode according to Example 3 of the disclosure and the traditional electrode.
Figure 12:
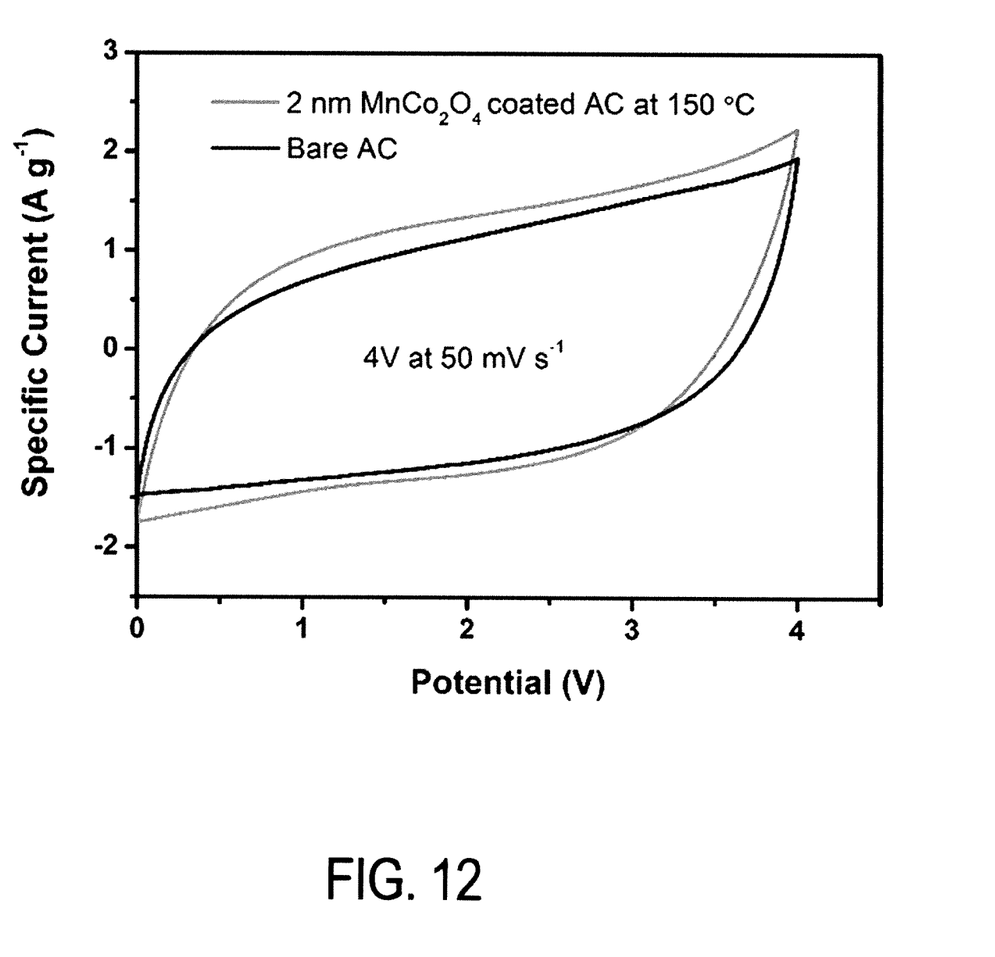
FIG. 12 illustrates the voltage vs. current density diagram, measured at 4V, of the electrode according to Example 3 of the disclosure and the traditional electrode.
Figure 13:
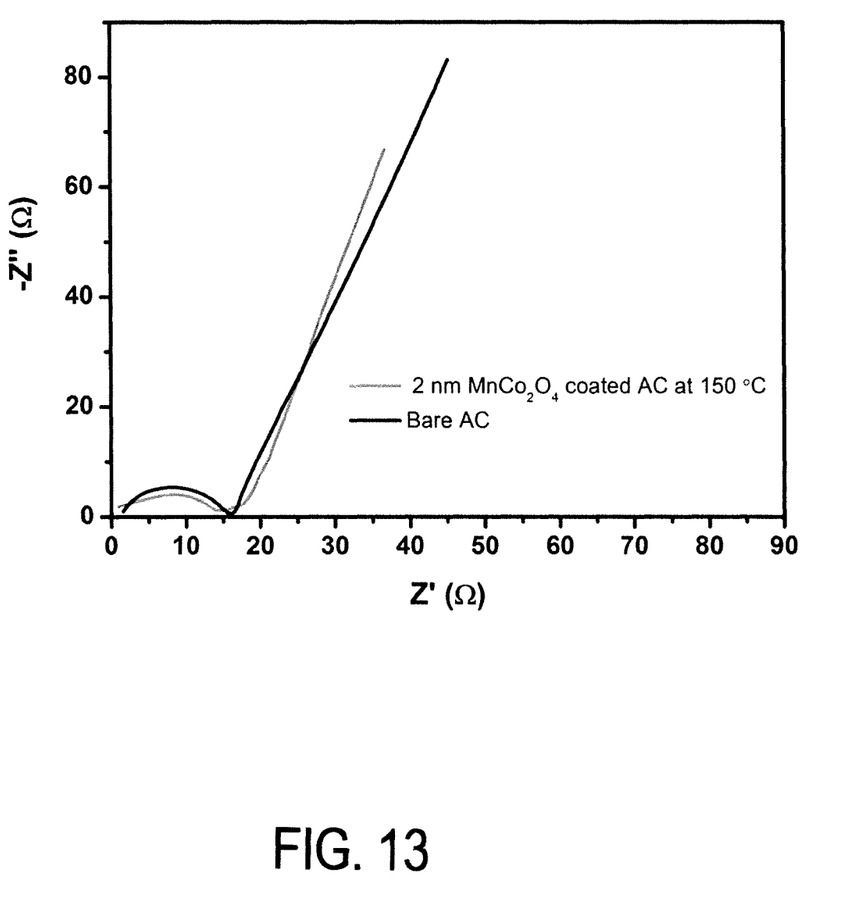
FIG. 13 illustrates the impedance test results of the electrode according to Example 3 of the disclosure and the traditional electrode.

Example 3 of the disclosure is an electrode including: an electrode terminal which is a current collector; an active layer which is activated carbon; and, a coating layer which is a spinel manganese cobaltate layer (2 nm). The electrode is made into a dual-electrode symmetric button batery (1 M TEABF4/acetonitrile), so as to test the electrochemical performances of the activated carbon electrode with the coating layer. The results are shown in FIGS. 11-13. FIGS. 11 and 12 show results measured at a scanning speed of 50 mV/s. FIG. 13 shows the electrochemical impedance of the electrode with the coating layer of 2 nm thickness and the bare electrode after 5000 cycles. It can be seen from FIGS. 11-12 that the electrode coated with the spinel manganese cobaltate layer shows higher current density and energy storage potential, and FIG. 12 shows that this electrode has a stable C-V cycle at 4V. It can be seen from FIG. 13 that the electrode with the coating layer still has lower impedance than that of the bare electrode even after 5000 cycles.

Unless stated otherwise, the above performance tests are performed by means of the conventional parameters in the art.

The above is only the embodiments of the present disclosure and does not thereby limit the scope of the present disclosure. All equivalent transformations made with the contents of the specification and drawings of the present disclosure, or directly or indirectly applied in the relevant technical fields, are encompassed by the protection scope of the present disclosure.

What is claimed is:

1. An electrode for supercapacitor, comprising an electrode terminal, an active layer and a coating layer successively from inside to outside;
   wherein a material for preparing the coating layer comprises an oxygenated compound, which contains at least one of transition metal elements or is doped with a substance containing a transition metal element;
   wherein the material for preparing the coating layer is at least one selected from zinc-doped alumina, zinc oxide-doped alumina, $MnCo_2O_4$ or $TiO_{2-x}$; wherein, x ranges from 0.01 to 1;
   wherein the active layer is at least one selected from conductive polymers, cellulose, activated carbon, oxygenated metal compounds or MXene $Ti_3C_2T_z$; wherein T is a surface terminal element, $z>0$;
   wherein the coating layer has a thickness of 1 nm to 4 nm.

2. The electrode for supercapacitor according to claim 1, wherein the electrode for supercapacitor is prepared by a method comprising the following steps: taking the electrode terminal with the active layer; and depositing the coating layer on the active layer to obtain the electrode for supercapacitor.

3. A supercapacitor comprising two electrodes, each of which comprises an electrode terminal and an active layer,
   wherein at least one of the active layers of the electrodes is provided with a coating layer,
   wherein a material for preparing the coating layer comprises an oxygenated compound which contains at least one of transition metal elements or is doped with a substance containing a transition metal element;
   wherein the material for preparing the coating layer is at least one selected from zinc-doped alumina, zinc oxide-doped alumina, $MnCo_2O_4$ or $TiO_{2-x}$; wherein, x ranges from 0.01 to 1;
   wherein the active layer is at least one selected from conductive polymers, cellulose, activated carbon, oxygenated metal compounds or MXene $Ti_3C_2T_z$; wherein T is a surface terminal element, $z>0$;
   wherein the coating layer has a thickness of 1 nm to 4 nm.

4. The supercapacitor according to claim 3, wherein the active layers of the two electrodes are made of same or different conductive material;
   when the active layers of the two electrodes are made of the same material, both of the electrodes are provided with the coating layers,
   when the active layers of the two electrodes are made of different material, only one of the electrodes is provided with the coating layer on a surface of the active layer.

5. An apparatus comprising the supercapacitor as defined by claim 3.

6. The apparatus according to claim 5, wherein the active layers of the two electrodes are made of same or different conductive material;
   when the active layers of the two electrodes are made of the same material, both of the electrodes are provided with the coating layers,
   when the active layers of the two electrodes are made of different material, only one of the electrodes is provided with the coating layer on a surface of the active layer.

7. The apparatus according to claim 6, wherein the apparatus is selected from a household electric appliance, a 3C electronic product or a new energy vehicle.

8. The apparatus according to claim 7, wherein the 3C electronic product is selected from a mobile phone, a tablet computer, a notebook computer or a digital audio player.

9. The apparatus according to claim 5, wherein the apparatus is selected from a household electric appliance, a 3C electronic product or a new energy vehicle.

10. The apparatus according to claim 9, wherein the 3C electronic product is selected from a mobile phone, a tablet computer, a notebook computer or a digital audio player.

\* \* \* \* \*

UNITED STATES PATENT AND TRADEMARK OFFICE
CERTIFICATE OF CORRECTION

PATENT NO. : 11,342,132 B2
APPLICATION NO. : 16/931705
DATED : May 24, 2022
INVENTOR(S) : Daniel Qi Tan, Dayarker Gandla and Guanghui Song Page 1 of 1

It is certified that error appears in the above-identified patent and that said Letters Patent is hereby corrected as shown below:

On the Title Page

Item (30) Foreign Application Priority Data, is missing. The correct priority data should read as follows:
--April 26, 2020 (CN) ..................................... 2020103389394--.

Signed and Sealed this
Thirty-first Day of December, 2024

Derrick Brent
*Acting Director of the United States Patent and Trademark Office*